No. 828,295. PATENTED AUG. 14, 1906.
I. W. AMMON.
COMPRESSED AIR MOTOR.
APPLICATION FILED SEPT. 24, 1903.

Witnesses:
O. Carlberg
C. Heymann

Inventor:
Ivan Vladimirovitch Ammon
per B. Singer
Attorney

No. 828,295. PATENTED AUG. 14, 1906.
I. W. AMMON.
COMPRESSED AIR MOTOR.
APPLICATION FILED SEPT. 24, 1903.

Witnesses:
O. Carlberg.
C. Heymann.

Inventor:
Ivan Vladimirovitch Ammon
per B. Singer
Attorney.

No. 828,295. PATENTED AUG. 14, 1906.
I. W. AMMON.
COMPRESSED AIR MOTOR.
APPLICATION FILED SEPT. 24, 1903.

Witnesses:
O. Carlberg.
E. Heymann.

Inventor:
Ivan Vladimirovitch Ammon
per B. Singer
Attorney

No. 828,295. PATENTED AUG. 14, 1906.
I. W. AMMON.
COMPRESSED AIR MOTOR.
APPLICATION FILED SEPT. 24, 1903.

Witnesses:
O. Carlberg.
C. Heymann.

Inventor:
Ivan Wladimirowitch Ammon
per P. Singer
Attorney.

No. 828,295. PATENTED AUG. 14, 1906.
I. W. AMMON.
COMPRESSED AIR MOTOR.
APPLICATION FILED SEPT. 24, 1903.

No. 828,295. PATENTED AUG. 14, 1906.
I. W. AMMON.
COMPRESSED AIR MOTOR.
APPLICATION FILED SEPT. 24, 1903.

UNITED STATES PATENT OFFICE.

IVAN WLADIMIROVITCH AMMON, OF ST. PETERSBURG, RUSSIA.

COMPRESSED-AIR MOTOR.

No. 828,295.  Specification of Letters Patent.  Patented Aug. 14, 1906.

Application filed September 24, 1903. Serial No. 174,411.

*To all whom it may concern:*

Be it known that I, IVAN WLADIMIROVITCH AMMON, a subject of the Emperor of Russia, and a resident of St. Petersburg, Russia, have invented a certain new and Improved Compressed-Air Motor, of which the following is a specification.

All existing motors, steam-engines included, have a common defect which is avoided with difficulty—viz., that they only convert a very small quantity of the heat expended into mechanical work. The best gas and petroleum motors, notwithstanding their relative economy, leave a great deal to be desired under these circumstances. The following are the reasons for their lack of economy: First, because of the elevated temperature of the gas driving them it is necessary to use cooling-water, which carries away with it up to forty per cent. of the heat; second, the driving-gas upon leaving the cylinder has also a high temperature and can carry away up to fifty per cent. of the heat. In the motor herein described the necessity for cooling the working cylinders is avoided and the possibility of recovering its former temperature after expansion is allowed to the motive air.

The theory of the motor is based upon the following phenomena: If a certain quantity of air be compressed, thereby increasing its elasticity, and if then without changing the latter the air is heated and is then expanded until its former pressure is reached, this air will produce, upon expansion, a superior work to that which shall have been expended for its compression. The surplus will be due to the heat acquired by the air upon heating. In the operation of this motor the air used for driving the same is first compressed and afterward heated to increase its volume. When this air expands, it will deliver the whole force of its reserved power, a portion of which is used for again compressing the air, the remaining portion being used for operative purposes. However, it must be noticed that during its compression the air becomes heated by itself. That is why in the present motor this air is submitted during compression to a very great cooling. This circumstance allows it when expanding to return to its former temperature. The possibility also appears of increasing its degree of compression and diminishing the effort required for this operation. Owing to its being cooled down to its former temperature the motor does not continually require fresh air. It can be supplied with the air already used, which is dry enough and heated to a determined but always constant temperature.

The motor may be divided into four principal parts: first, the motor proper, composed of the cylinders in which the heated air expands and drives the pistons; second, the feed-compressors driven by the motor itself; third, the heating apparatus, serving to heat the air compressed by the compressors; fourth, the chamber through which the air already used returns to the compressors.

In the annexed drawings, given by way of example.

Figure 1:
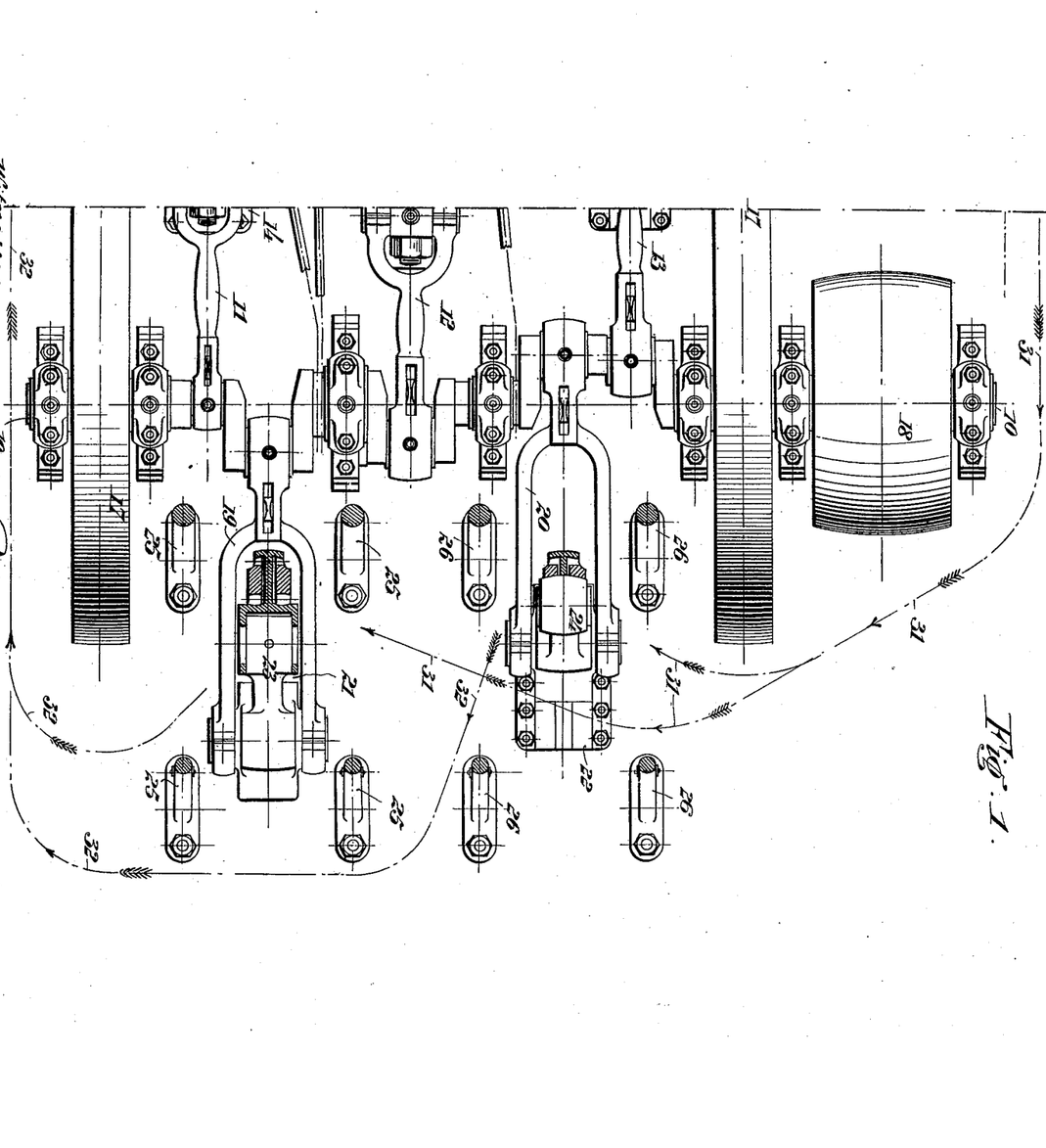
Figure 1 is a partial plan and partial horizontal section of the motor.

*General construction of the motor.*—The best form of construction is to apply the principle of triple expansion—that is to say, to expand the heated air successively in three cylinders. The cranks for the cylinders, which are fitted upon a common shaft and at angles of one hundred and twenty degrees one to the other, rotate in the following order: first, the crank for the small or high-pressure cylinder, then that for the intermediate or middle cylinder, and next that of the large or low-pressure cylinder. Fig. 1 shows the plan view of the motor and from which its general construction may be seen. 1 is the small or high-pressure cylinder, 2 the intermediate or middle cylinder, and 3 the large or low-pressure cylinder of the motor. There is no difference between their construction and that of steam-engines. They are furnished with pistons 4, 5, and 6, constructed in the usual manner, and simple cylindrical and balanced slide-valves 7 8 9, actuated by rods of the eccentrics fitted upon the shaft 10. The inlet of air takes place by the inner ports of the slide-valves and the outlet or exhaust by the outer ones. The pistons and slide-valves reciprocate inside steel linings fitted into the cast-iron cylinders. Between the linings of the cylinders and their body a small space is left. The air remaining in this space decreases the loss of heat by radiation. The cylinders are furnished with oil-pots for lubricating the bearing-surfaces, with cocks for drawing off the oil remaining therein, and openings for gages. All stuffing-boxes must be furnished with metallic packing.

The motor transmits its motion to the crank-shaft 10 by means of connecting-rods 11, 12, and 13, the cross-heads whereof run in slides 14 15 16. Upon the ends of this shaft are placed the fly-wheels 17, as well as the pulley 18, serving to transmit the motion. Besides the cranks connected to the connecting-rods 11, 12, and 13 the shaft has still two others intended to transmit the motion to the feed-compressors. These cranks are arranged at one hundred and eighty degrees to each other. By this disposition the alternation in the action of the two compressors is obtained. When one sucks in air, the other expels it and reciprocally. The crank-pins of these two cranks are surrounded by the heads of the connecting-rods 19 20. The opposite ends of the connecting-rods are connected to the cross-heads of the slides 21 22. These cross-heads in turn actuate the connecting-rods 23 24, driving the pistons of the compressors. The manner of transmission to the compressors will be hereinafter described.

One compressor is fitted upon the standards 25 and the other upon the standards 26. (To render the drawing clearer, the compressors are not shown in Fig. 1.) 27 indicates the heating apparatus for air; 28 the chamber, through which expanded air from the cylinders returns to the compressors. The arrows 29 indicate the direction of the air from the heater to the high-pressure cylinder. From thence, passing successively through the intermediate and large or low-pressure cylinder, the air, as shown by the arrows 30, passes through the chamber 28, thence, according to the arrows 31, enters the compressors, and, finally, as shown by the arrows 32, returns to the heating apparatus.

The pipe connecting the compressors to the heating apparatus is furnished with an air-inlet cock and a manometer. (Not shown on the drawings.) This air-inlet cock serves to start and stop the motor. After the motor has stopped no air should remain in the heater. When choosing the situation for this heater, care must be taken that the pipe leading from the high-pressure cylinder to the aforesaid heater be as short as possible. A reserve-cock, always kept open, may be fitted upon this pipe.

Figure 2:
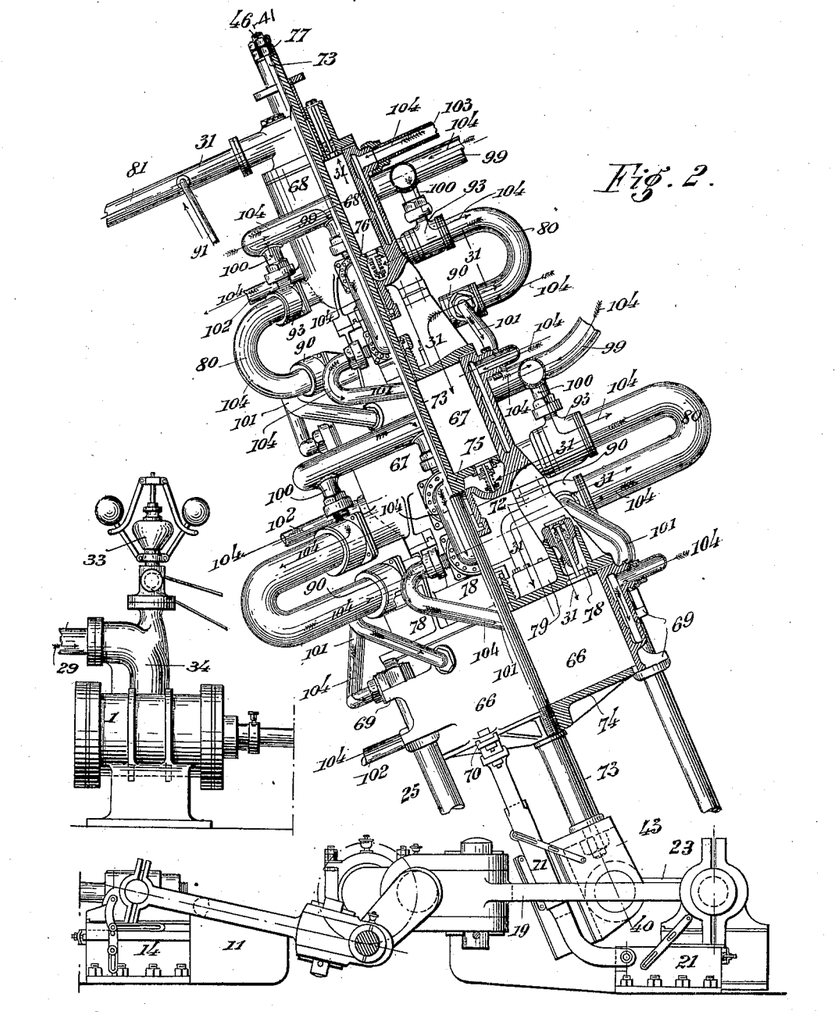
Fig. 2 is a view, partly in elevation and partly in section, through the axial line of one of the compressors.

Fig. 2 is a side view of the high-pressure cylinder of the motor as well as of one of the compressors. Thereon may be seen the position of the centrifugal governor 33, regulating the speed of the motor by means of a cylindrical valve placed inside the box 34.

Figure 3:
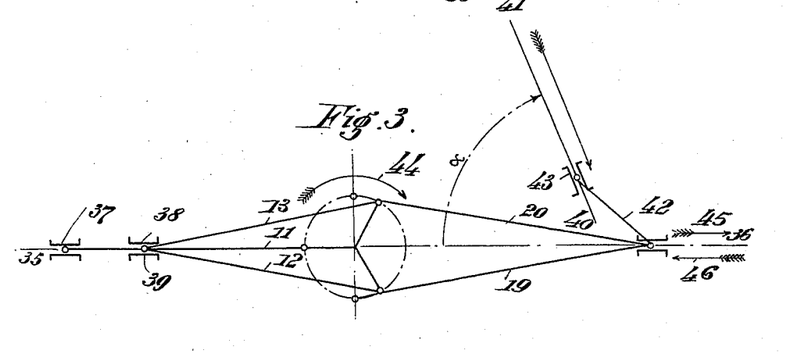
Fig. 3 is a diagram representing the transmission of the rotation from the pistons to the compressors.

*Transmission of motion to the compressors.*—This is the essential portion of the invention. As well known, the resistance of the compressors presents a very irregular value, and to avoid this double or triple acting compressors are generally built, the crank actuating the compressors being fitted perpendicularly to that of the motor. Owing to the high pressure of the air, a similar procedure would not suit the compressors of the present motor because at the end of the stroke of the pistons of the compressors their resistance may have reached such a height that the cranks of the motor, however well they are placed, could not overcome it. To regulate the resistance of the compressors, the following disposition has therefore been made: First, as already stated, the cranks actuating the compressors are fitted at one hundred and eighty degrees one to the other, thereby causing the alternate motions of the compressors; second, the two compressors are triple-acting, (in cases of not very high pressure they may be double-acting;) third, the transmission of the motion to the pistons of the compressors is arranged in such a manner that their resistance is fairly uniform at the slipper cross-heads 21 and 22. Fig. 3 shows the diagram of the motor 35 36, the surface passing through the axial line of the cylinders of the motor and the shaft of the same. 11, 12, and 13 are the connecting-rods transmitting the motion from the cylinders to the shaft; 37 38 39 their cross-heads. (This figure shows the moment at which the positions of the two latter cross-heads coincide.) The connecting-rods 19 20 move the slide cross-heads 21 22, Fig. 1. (The positions of these cross-heads also coincide.) The cranks of the connecting-rods 19 20 are perpendicular to one of the three remaining cranks which yield the least work, Fig. 3. The line 40 41 is the geometrical line of the compressors. It is inclined and forms the angle $a$ with the motion-line of the last two cranks. 23 is the connecting-rod of one of the compressors connected at its lower end to the cross-head of the slide 21, Fig. 1, and at its upper end to the cross-head 43, moving in the direction of 40 41, and it directly actuates the piston-rods of the compressor. The corresponding cross-head of the connecting-rod 20 actuates the pistons of the other compressor in exactly the same manner.

If the cranks turn in the direction of the arrows 44 according to the position represented, the connecting-rod 20 will force its cross-head according to the arrows 45, and the connecting-rod 19 will draw the corresponding one following the arrows 46. The pistons of the compressor corresponding to the first cross-head will take the direction of 47 and those of the other compressor will take the opposite direction. When the pistons of the compressor corresponding to the connecting-rod 23 are at their lowest point, this connecting-rod coincides with the motion-line of its lower cross-head. It is easily understood that the length of this connecting-rod and that of the stroke of the two cross-heads are all equal. When the pistons of the compressor are upon their top dead-center, the resistance of the compressors will be of highest value; but upon the line 35 36 the effort required will be much less. By comparing these conditions it will be easily understood that the effort required from the lower cross-head of the connecting-rod 23 must be more or less uniform and that the manner of transmission to the compressors replies in principle to its object. The whole effect depends upon the choice of the angle.

*Structure of the cross-heads.*—The moving of the cross-heads of the connecting-rod 23, Fig. 3, if they were made in the usual manner, would necessitate a considerable expenditure of power because at the beginning of the stroke of the compressor-pistons the upper cross-head of the connecting-rod 42, as well as its bottom cross-head when at the end of its stroke, meet a considerable normal pressure, which greatly increases their friction. First, to avoid all that and then the great expenditure of work in order to overcome the friction of the other cross-heads, the sliding friction is replaced everywhere by the rolling friction. In this wise the friction and costs of lubricating are nearly *nil*.

Figure 4:
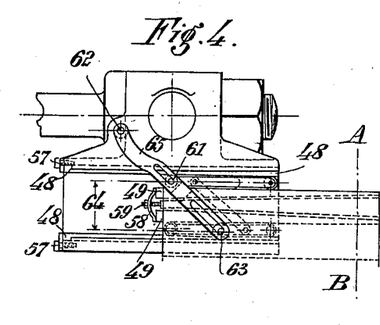
Figs. 4 to 10 are detail views of the cross-heads used for transmitting the motion of the pistons to the crank-shaft and compressors.
Figure 5:
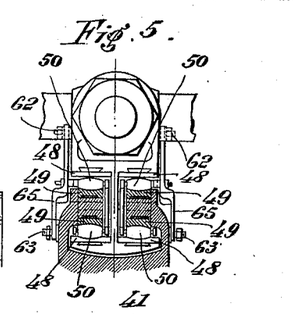
Figure 6:
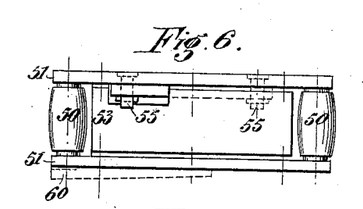
Figure 7:
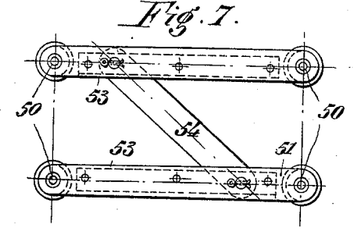
Figure 8:
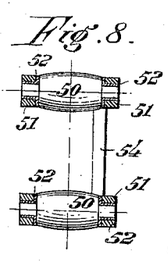
Figure 10:
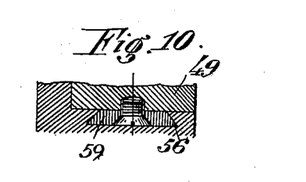

The description of one of the cross-heads is as follows, reference being had to Fig. 4, which shows the side view of a cross-head and of its slide, and Fig. 5 a section thereof on A B of Fig. 4. The cross-head proper, fitted upon the rod, is provided at its lowermost part with an enlarged portion, the cross-section whereof resembles a double T-iron, as seen from Fig. 5. By means of this enlarged portion the cross-head engages in the slide-guide between them, and in grooved plates 48 49 rollers 50 are placed, made from the best steel well tempered and having the form of cylinders with rounded ends. The normal pressure is immediately transmitted to the rollers running in the channels by means of the cross-heads. Each slide is provided with eight similar rollers, four at the top and four at the bottom. In order that the relative position of the rollers in the same channel does not change, they are coupled by means of plates 51, Figs. 6, 7, 8. These plates are furnished at their ends with openings in which pass the bronze rings 52. Through these rings pass the pins formed at each end of the roller. The two plates are connected together by means of bent sheets of metal 53, to which they are fixed by means of screws. Each top and bottom pair of rollers are in turn connected by the plate 54, fixed to the top and bottom plates 51 by means of the pins 55, so that if the vertical distance between the top and bottom pair of rollers changes the plate 54 will not impede it, but will simply change inclination. The two grooved plates 48 and 49, in which the rollers 50 run, must also be made of tempered steel. They are fixed to the guide and to the cross-head in the following manner: Fig. 10 shows a cross-sectional view of a similar plate 49 and channel 56. A tapered and beveled strip 59 is secured to the plate 49 by suitable screws, as shown in this figure. This strip terminates in a threaded end, as shown in Fig. 4, and is adapted to enter a recess made in the cross-head and the slide and extends their whole length and engages with said channel. These channels are fastened to the cross-heads by means of plates and screws 57, Fig. 4. The aforesaid channels are distinguished, first, by the fact that the surface onto which the strip 59, Fig. 10, is screwed, is slightly tapered, (see Fig. 4,) and, secondly, they can move backward and forwards in the direction of that strip. This is done so that the spring 58, fixed upon the strip 59 and bearing by its end on the plate 49, tends constantly to push the same into the slide, thereby obliging them by reason of the taper to touch the rollers. Each slide is provided with two similar springs, one upon the right and the other at the left, corresponding to the groups of rollers at the right and at the left. In order that the set of rollers for various reasons may not change its regular position, a special mechanism has been provided and which is based upon the following property of rollers: If upon the roller placed upon a surface a second surface is placed parallel thereto and one of them is moved, obliging the roller to move in the same direction while the surface moves a distance $a\ o$, the roller only moves a distance equal to $\dfrac{a\ o}{2}$.

Figure 9:
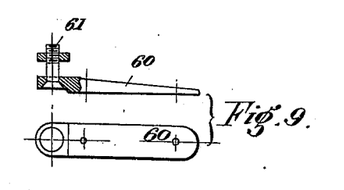

The following is the construction of the controlling mechanism: Upon the right and the left of the slide links 60 (shown separately in Fig. 9) are fixed to the top outside plates 51, as shown in dotted lines on Fig. 6. Each of these links is provided with a pivot 61. When the cross-head moves, the center of that pivot as well as the rollers only perform half the stroke of the cross-head. The cross-head and slide are also provided with pivots 62 and 63, Figs. 4 and 5. The distances vertical from the centers of these pivots to the center of the pivot 61 are equal. On Fig. 4 these equal distances are shown by the number 64. The three pivots are connected together by a lever 65. It is fitted by its upper end upon the pivot 62. It surrounds the pivot 61 by means of a slot arranged in its middle portion, and by means of the slot in its lower end it surrounds the pivot 63. In Fig. 4 the extreme left-hand position of the cross-head is shown. By its motion to the right it carries with it the upper end of the lever 54. The center spindle 61 while moving will always be, owing to the distances 64 being equal, separated from its extreme position by a distance equal to half the stroke of the cross-head—that is to say, will move with the rollers—thereby preventing them shifting from their regular position. Levers similar to 65 are disposed upon both sides of the slide (for each set of rollers) and at places where the levers are not slotted they can be curved, as shown in Figs. 4 and 5, so as not to encounter when working any part of the cross-head or slide. All the cross-heads of the motor are of the same construction. When they are being made, note must be made of the following: The cross-heads of the working cylinders will have the upper and lower rollers of the same size, while the cross-heads of the compressors will be furnished with rollers, the upper ones whereof are larger than the bottom ones, according to what they are intended for. The distance between the centers of rollers moving in a same groove cannot be less than half of the cross-heads' stroke. Before being fitted in place, the rollers are submitted to a great rolling pressure, (over that required.)

*Construction of the compressors.*—From Fig. 2 is seen the position and the construction of one of the feed-compressors. The left-hand side of the center line 40 41 represents the outside view, the right-hand side the longitudinal section of the compressor. In this compressor 66 is the large cylinder, 67 the intermediate, and 68 the small cylinder. The large cylinder 66, open at the bottom, is furnished with four bosses 69, by means whereof it can be fixed upon the standards 25. Beside these cross-piece 70 is fixed to its bottom end by means of bolts, and upon which bears the slide 71, guiding the movement of the cross-head 43. This slide bears by its bottom end upon the slide 21. Bosses 72 are provided upon the top cover of the large cylinder. Similar bosses are provided upon the bottom cover of the intermediate cylinder, equally disposed to the preceding ones. The former are connected to the latter by bolts, and the intermediate cylinder 67 is thus connected to the large cylinder 66. The small cylinder 68 is connected in exactly the same manner to the intermediate 67. These cylinders are in alinement and their pistons are fitted upon the same rod 73. The piston 74 of the large cylinder is in the shape of a disk, provided at its lower side with an internally-screw-threaded box, as well as with ribs, rendering it stronger. This piston is hermetically screwed upon the rod 73. The pistons 75 and 76 of the intermediate and small cylinders are also in the shape of disks, having at their upper sides tubular-shaped bosses 76$^a$, by means whereof they are fitted upon the thin portion of the shaft 73 and are locked in place by means of nuts 77. Thin copper rings are provided whereby tight joints may be obtained between the pistons and their respective cylinders. To obtain greater strength, these pistons are furnished, like the big one, with ribs. Segments also are provided upon the pistons so that their contact may be more intimate with the working surface of the cylinders. All the stuffing-boxes on the compressor should be furnished with a metallic packing. In their downward motion the pistons suck in the air and on the return stroke they compress it and force it out. Air enters the compressors in the following manner: The cover of the large cylinder is provided with a large ring-shaped channel 78; upon one side of this channel is fitted a union. (Not shown in the drawings.) To this union is fitted the end of a pipe from the chamber 28, Fig. 1, air passing from this chamber in the direction of the arrows 31 through several valves placed in the channel 78 and is sucked into the large cylinder. From thence through the valve shown in Figs. 12 and 13 on the bosses 79 and through the coolers 80 the air, already compressed to a certain degree, passes into the lower part of the intermediate cylinder. The piston of this cylinder during its downward stroke allows air to pass through its valves, which are similar to those for the large cylinder, and in the same order introduces it into the small cylinder 68 through the cooler, and from thence the piston 76 forces it into the pipe 81, joined to the heater. The directions of the air are indicated by the arrows 31.

Figure 11:
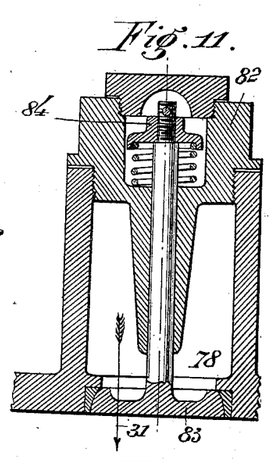
Figs. 11 to 17 are detail views of certain parts of the compressors.

The component parts of the compressor are made in the following manner: The inlet or suction valves for the big cylinder are shown in Fig. 11. A channel 78 is formed in the cover of the big cylinder of the compressor and in each of the openings made at the top of the channel is screwed a guide-box 82, through which passes the spindle of the valve 83, surrounded by the washer 84. In this washer bears a coiled spring tending to close the valve 83. The box 82 is furnished with a cover screwing thereinto, which when it is once taken off permits the strength of the spring to be adjusted by screwing the washer 86 on or off. The direction taken by the air is shown by the arrow 31.

Figure 12:
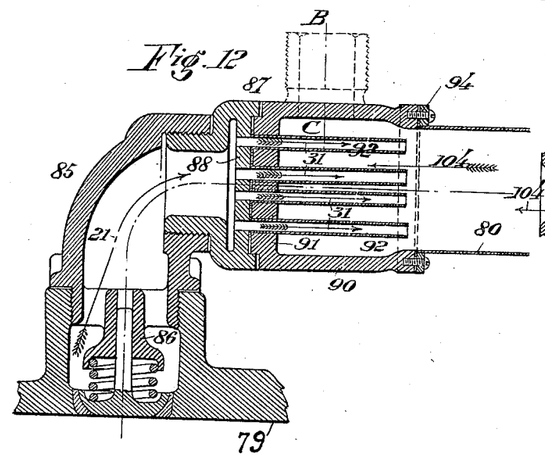
Figure 13:
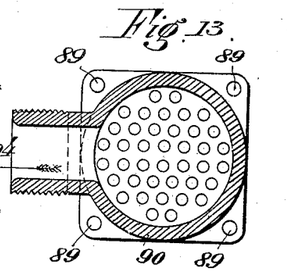

The valve giving passage to air from the large and intermediate cylinders is constructed as follows: Fig. 12 is the longitudinal section, and Fig. 13 a cross-section on the line B C of Fig. 12. Bends 85 are screwed into the cylindrical bosses 79 on the covers of the large and intermediate cylinders. Upon the cross-braces of each bend is placed the guide-box 86, inside which enters the valve-spindle, the construction whereof is seen from the drawings. Into the other end of the bend is screwed the union 87, provided in its outer wall 88 with openings. Against this wall is fixed the box 90 by means of bolts passing through the holes 89. In the wall 91 openings are arranged, which correspond by their disposition with the openings in the wall 88. (See Fig. 13.) Through these openings pass copper tubes 92. The ends of these are bent and firmly held between the walls 88 90. Air passing through the opening of the valve is directed into the tubes, as shown by the arrows 31. The opposite ends of the tubes are fixed in the same manner to the inner portion of the next cylinder, to which is first screwed the union 87. To the latter is fixed, by means of holes, the box 93, Fig. 2, distinguished from the box 90 because instead of a lateral boss, Fig. 13, it has exactly the same, but at the top. (Shown in dotted lines on Fig. 12.) The tubes 92 are covered along their length with an india-rubber or tarpaulin hose 80', the ends whereof are tightly held by the metal rings 94, held by screws upon the boxes 90 and 93. Into this hose, as will be seen later, runs water, which cools as much as possible the air passing through the tubes 92.

Figures 14, 15, 16, 17, 21, 22, 23:
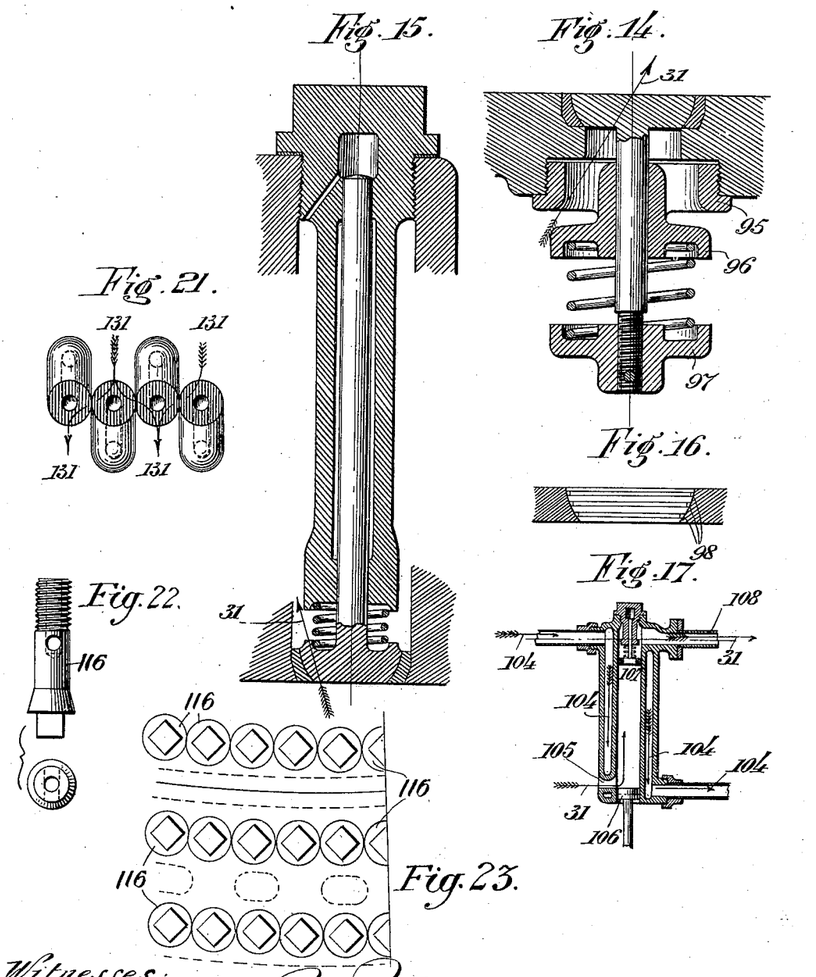
Figs. 20 to 23 are detail views.

*Structure of the suction-valves upon the piston of the intermediate and small cylinders, Fig. 14.*—The pistons are provided at the bottom with small bosses. Into the opening of each boss is screwed a ring 95, the inner cross-braces whereof maintain the guide-box 96. Through the latter passes the spindle of the valve, surrounded by the washer 97, against which presses the spiral spring, closing the valve. The direction taken by the air is shown by the arrow 31.

The outlet-valve on the small cylinder, Fig. 15, resembles in construction the inlet-valve into the cooler, Fig. 12. The air passes through it, as indicated by the arrow 31, and passes through the pipe toward the heating apparatus, Fig. 2. The valves should be made of steel or bronze, having the working surface rounded. In order that they may be more sensitive for opening, they are provided upon their working surface with a few shallow grooves 98, Fig. 16. After closing the valves the air remaining in these grooves remains compressed to a certain point, and by its counter resistance facilitates their reopening. To avoid shocks in these valves, their closing should take place when the speed of the pistons is changed, which is obtained by adjusting the springs. The valves can also be of any other pattern. All the cylinders of the compressors are furnished with oil-boxes, openings for manometers, and indicators, and the small cylinder should also have a cock for escape of air from the cylinders of the compressor after the motor has stopped.

*Cooling the compressors, Fig. 2.*—Each cylinder of the compressor is cooled independently of the others. In the large and intermediate cylinders the cooling takes place in the same manner. Above each of them are arranged water-pipes 99, from whence lead the pipes 100, conducting to the boss 93; through these pipes flows the water which passes from thence through the hose 80 to the lower bosses 90; from thence through the pipes 101 it enters into the water-jacket surrounding the two cylinders and finally escapes through the pipes 102. For the small cylinder the wall only is cooled, because the air compressed therein is intended for heating and there is no necessity to cool it upon leaving the cylinder. Here the water enters the jacket through the pipe 103 and escapes through the pipe 102. The direction taken by the water is shown everywhere by the arrows 104.

*Hand air-pump for previously introducing air.*—When the motor is started, compressed air should be contained in the pipe 81 connecting the compressors to the heating apparatus. For this purpose the motor is furnished with a small hand-pump, the construction whereof is seen from Fig. 17. The arrows 31 indicate the direction taken by the air entering the pump through the opening 105 when the piston 106 is in its lowest position and then passing through the opening of the valve 107 into the pipe 108, connected to the pipe 81, Fig. 2. The arrows 104 indicate the direction of flow of the water through the jacket of the pump. The pump may be supported and driven in any convenient manner.

Figure 18:
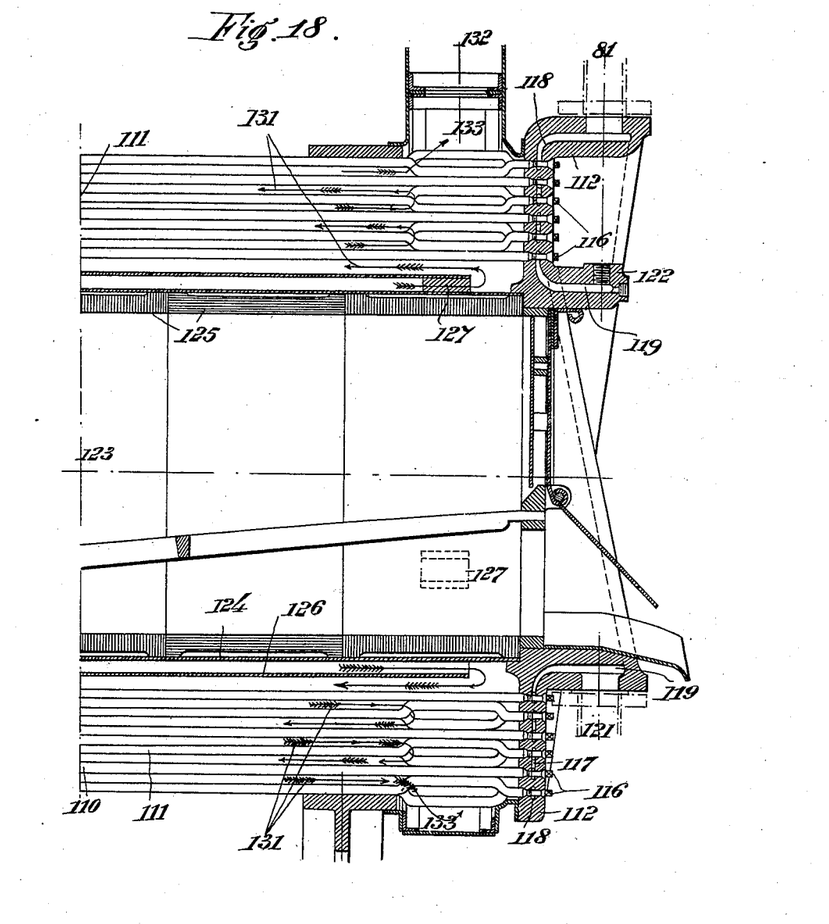
Fig. 18 is a longitudinal section of the apparatus heating the air.
Figure 19:
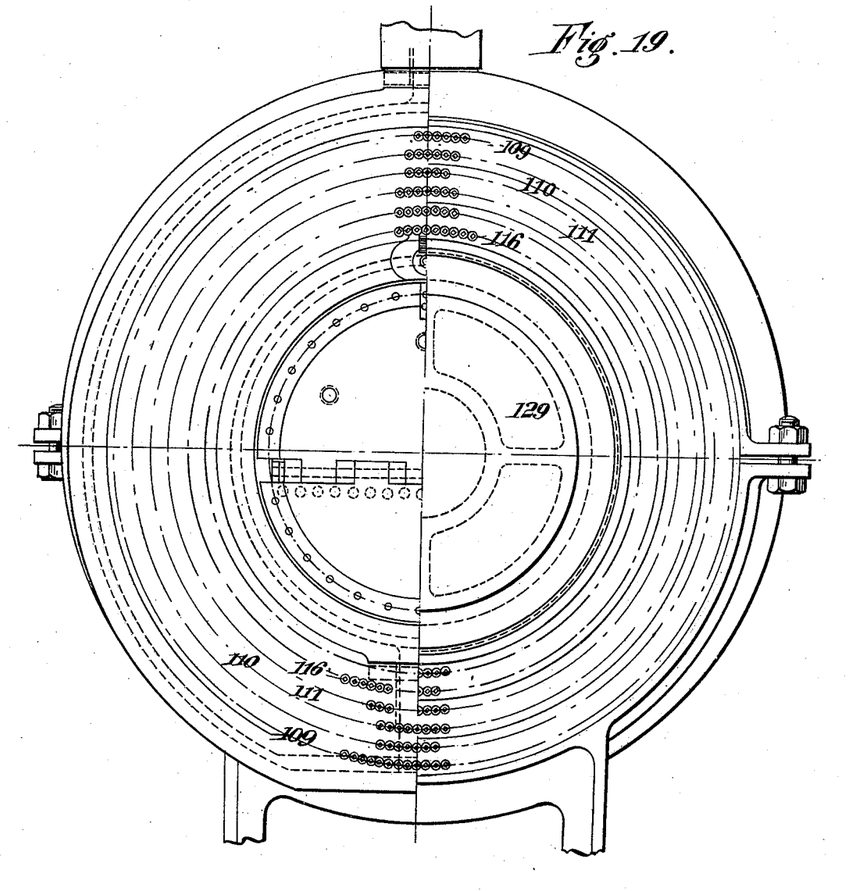
Fig. 19 shows a view, partially from the left and partially from the right-hand side of the said heating apparatus.
Figure 20:
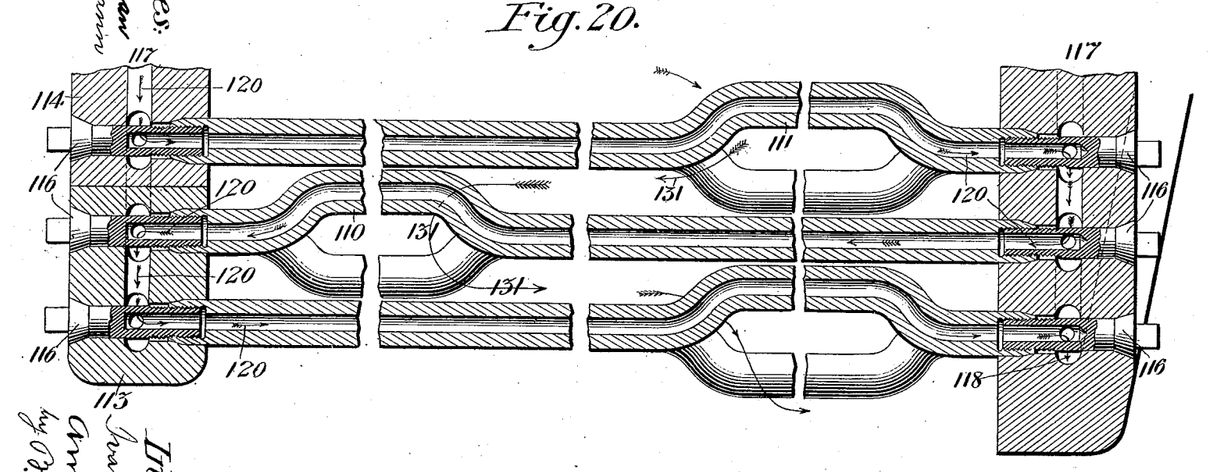

*Apparatus for heating the air, Figs. 18 to 23.*—The construction of this apparatus is based upon the following: The air passes through pipes having rather a small bore and the products of combustion (not the flame) come in contact with the outside of these pipes. Fig. 18 shows the longitudinal section of the apparatus. Fig. 19 shows right and left hand portions thereof; Fig. 20, the longitudinal section of the tubes upon a large scale, and Fig. 21 a cross-section of said tubes. The row of iron tubes placed close together in a circle form a cylinder 109. Inside this cylinder is placed a second, of the same construction, but having a smaller diameter. A certain space must be left between these two cylinders. Inside the second cylinder is placed a third 111, and so on. The ends of all these tubes are conical, and entering conical openings in the cast-steel boxes 112 113 114 115, Figs. 18 and 20, are fixed therein by a union or ferrule 116. (Fig. 22 shows a part a union of that description.) Two holes are made in each ferrule, one in the axial direction, but not right through from end to end. The other passes through the ferrule at right angles to the former. These two holes unite the inside of the tubes to the ring-shaped channels 117 118 119, Figs. 18 and 20, permitting the air to pass from one row of tubes to the other. These channels are arranged so that air compressed by the compressors enters through the pipe 81 into the channel 118, passes successively through all the rows of tubes, as shown by the arrows 120, then enters the channel 119, and from thence through the pipes 121 to enter finally into the small or high-pressure cylinder of the motor. A boss 122 is provided upon the channel 119 to receive a manometer and a safety-valve. Inside the whole of this set of tubes is placed the fire-box 123, formed of an iron cylinder 124, furnished interiorly with fire-bricks 125. Round this cylinder and separated by a small space from the same is placed a second iron cylinder 126, protecting the tubes from direct contact with the fire. In the space separating these two cylinders are placed and fixed the iron blocks 127, upon which bears the inner surface of the cylinder 126. The ends of these two cylinders bear upon the boxes 115 112. The iron ring 128 maintains the reflector 129, made of fire-clay, and its center is closed by an iron plate 130. If this ring be taken off, the whole fire-box can be withdrawn for cleaning or to change the bricks. In every other sense the fire-box is of an ordinary construction and if required can be prepared for any kind of heating. The products of combustion leave the box in the direction shown by the arrows 131, and having passed through space comprised between the cylinders 124 to 126 come in contact with the tubes and pass from row to row between the ends of the tubes bent for this purpose, Figs. 18, 20, 21. After passing through all the rows these products escape by the chimney 132 after passing through the smoke-box 133, as shown by the arrows 131.

As the tubes of the various rows expand unequally, owing to the heating, one of the boxes holding them is made of several rings 113 114 115, placed one inside the other. When the tubes expand, the rings move and thus avoid the irregular tensions of the tubes. In order that the contact of the tubes between themselves be more intimate when put in place, they are ground down with red lead, and besides this the inner row is covered upon its inside with fire-clay.

The heating apparatus can be placed vertically or horizontally, and for heating different combustibles may be used, such as coal, petroleum, combustion products from blast-furnaces, &c.

The chamber through which air already used returns to compressors is a metal or wooden box 28, connected by tubes to the large cylinder of the motor and the small cylinders of the compressors. From its upper end leads the pipe 134, the opposite end whereof opens into the cooling-chamber containing the cold and dry air. This pipe maintains the pressure inside the chamber equal to that of the atmosphere and makes up the unavoidable losses of air in the motor. The volume of the chamber should be several times that of the large cylinder of the compressor. To start the motor, it is necessary to fill with compressed air by means of the hand air-pump the pipe connecting the compressors with the heating apparatus, then light the furnace, and when it is sufficiently heated open the inlet-cock into the heater. The motor then starts working. The heating in the furnace should be as regular as possible. That is why it is preferable not to admit a forced draft therein. When the motor stops, the first thing to do is to open the furnace-doors, thereby reducing the inside temperature. Then the inlet-cock into the heater is closed. Then by opening the cocks fitted to the small cylinders of each compressor all the air remaining above the compressor-pistons is allowed to escape.

Having now fully described my said invention, what I claim, and desire to secure by Letters Patent, is—

1. The combination in a motor operated by compressed and heated air of three cylinders in which the compressed and heated air expands successively, of a crank-shaft, driven through connecting-rods by the piston-rods of the driving-pistons, two air-compressors, operated by means of connecting-rods by the said main shaft, the axial line of each of these compressors making a suitable angle with the working axial line of the cross-head operating the pistons of the corresponding compressor by means of a connecting-rod, the length of this connecting-rod, the stroke of the compressor-piston and that of the cross-head being equal, as described and shown.

2. The combination in a compressed and heated air motor with three motor-cylinders, of a crank-shaft and two air-compressors, of pipes leading the compressed air to an air-heating apparatus, a pipe leading the heated and compressed air to the distributer of the smallest of the three motor-cylinders; a pipe leading the expanded air from the largest of the three motor-cylinders to a chamber and a pipe leading air from this chamber to the aforesaid compressors, as described and as shown.

IVAN WLADIMIROVITCH AMMON.

In presence of—
R. WILLIAMS,
H. EMAULT.